US005667253A

United States Patent [19]

Jansen et al.

[11] Patent Number: 5,667,253

[45] Date of Patent: Sep. 16, 1997

[54] DEVICE FOR CONNECTING A FEED OFF AND RETURN TUBE TO A CONTAINER FOR LIQUIDS

[75] Inventors: Cornelis Jacobus Jansen, Rijen; Stephanus Franciscus Schilthuizen, Berkel-Enschot, both of Netherlands; Peter Marriott, Chesterfield, United Kingdom; Joachim Leifels, Gueron, France

[73] Assignees: Wiva Verpakkingen B.V., Netherlands; Micro-Image Technology Ltd., United Kingdom

[21] Appl. No.: 417,594

[22] Filed: Apr. 7, 1995

[30] Foreign Application Priority Data

Apr. 8, 1994 [NL] Netherlands ............................ 9400563

[51] Int. Cl.$^6$ ...................................................... F16L 35/00

[52] U.S. Cl. ............................ 285/26; 285/901; 285/913; 222/400.7; 222/545

[58] Field of Search .................................. 285/25, 26, 28, 285/29, 130, 131, 137.1, 901; 222/400.7, 542, 545

[56] References Cited

U.S. PATENT DOCUMENTS

| | | | |
|---|---|---|---|
| 2,837,749 | 6/1958 | Gross | 285/137.1 X |
| 4,288,108 | 9/1981 | Streit | 285/137.1 |
| 4,467,987 | 8/1984 | Knebel | 285/137.1 |
| 4,968,309 | 11/1990 | Andersson | 285/137.1 X |
| 5,170,841 | 12/1992 | Briet | 285/137.1 X |

FOREIGN PATENT DOCUMENTS

| | | | |
|---|---|---|---|
| 1384 | 10/1886 | United Kingdom | 285/901 |

*Primary Examiner*—Dave W. Arola

*Attorney, Agent, or Firm*—Webb Ziesenheim Bruening Logsdon Orkin & Hanson, P.C.

[57] ABSTRACT

A device for connecting at least a feed off and return tube to a bung-hole of a container for liquids and the like having threads at its inner periphery, said device comprising a cylindrical insert having threads at its outer periphery co-operating with the thread of the bung-hole, and a bottom part provided with at least two orifices, a tube mounting having a lower surface to be placed on the bottom of said insert and provided with ports being in communication with said orifices of the insert, and a clamp means to clamp said mounting into said insert, wherein the tube mounting and the insert are provided with lugs and co-operating recesses located according to a certain pattern, wherein a recess is arranged in the wall of an orifice debouching in the bottom of said cylindrical insert, and the co-operating lug protrudes axially out of the tube mounting or vice versa, such that with only two lugs a large number of coding possibilities is provided for.

10 Claims, 3 Drawing Sheets

DEVICE FOR CONNECTING A FEED OFF AND RETURN TUBE TO A CONTAINER FOR LIQUIDS

BACKGROUND OF THE INVENTION

1. Field of the Invention

The invention relates to a device for connecting at least a feed off and return tube to a bung-hole of a container for liquids and the like having threads at its inner periphery, said device comprising a cylindrical insert having threads at its outer periphery co-operating with the thread of the bung-hole, and a bottom part provided with at least two orifices, a tube mounting having a lower surface to be placed on the bottom of said insert and provided with ports being in communication with said orifices of the insert, and a clamp means to clamp said mounting into said insert, wherein the tube mounting and the insert are provided with lugs and co-operating recesses located according to a certain pattern.

2. Background Information

Such devices are used to connect a feed off respectively return tube for special liquids out of and into a container. The device therein serves as safety device, that is, only a pre-coded container can be connected to the feed off respectively return tube. Such a coding takes place by means of the lugs and recesses between the insert and the tube mounting. Such a device is known from the American patent U.S. Pat. No. 4,699,298. The recesses and lugs are therein arranged between the inner surface of the cylindrical insert and the outer surface of the mounting. This provides a limited number of coding possibilities.

SUMMARY OF THE INVENTION

The invention has for its object to obviate the above stated drawback and provides for this purpose a device which is distinguished in that a recess is arranged in the wall of an orifice debouching in the bottom of said cylindrical insert, and the co-operating lug protrudes axially out of the tube mounting or vice versa.

Due to the fact that the recesses and the lugs co-operating therewith are arranged at the wall of the port respectively orifice, when two orifices are used only two lugs are necessary to nevertheless provide a large number of coding options, since each lug can be placed at a random location over 360°. The use of two lugs has the advantage of simple method of production because only a small adaptation of the injection moulding die is necessary, wherein the advantage is also achieved that when an erroneous tube mounting is connected to the insert, the two protruding lugs form a tilt axis so that the user is immediately informed visually of the incorrect coupling.

In a further development the insert is provided with a thread at its inner periphery with which for instance the clamp means embodied as screw element for the tube mounting can co-operate. This thread is also suitable for receiving a closure when the container must be closed for transport, this such that the upper rim of the bung-hole of the container is left free for arranging of a seal.

BRIEF DESCRIPTION OF THE DRAWINGS

Above mentioned and other features of the invention will be further elucidated in the figure description hereinbelow of an embodiment. In the drawing.

DESCRIPTION OF THE PREFERRED EMBODIMENTS

Figure 1:
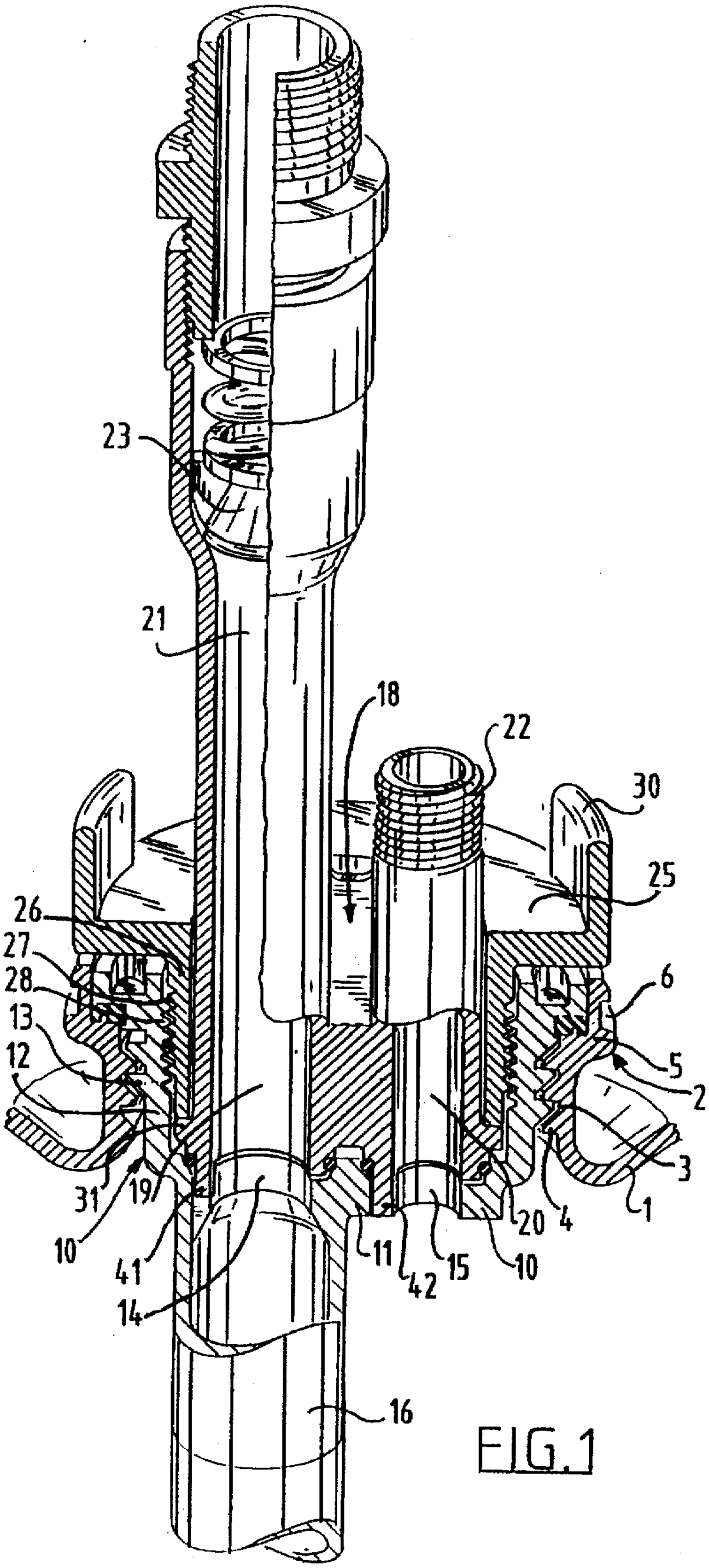
FIG. 1 shows a perspective view, partly in section, of the connecting device according to the invention.
Figure 2:
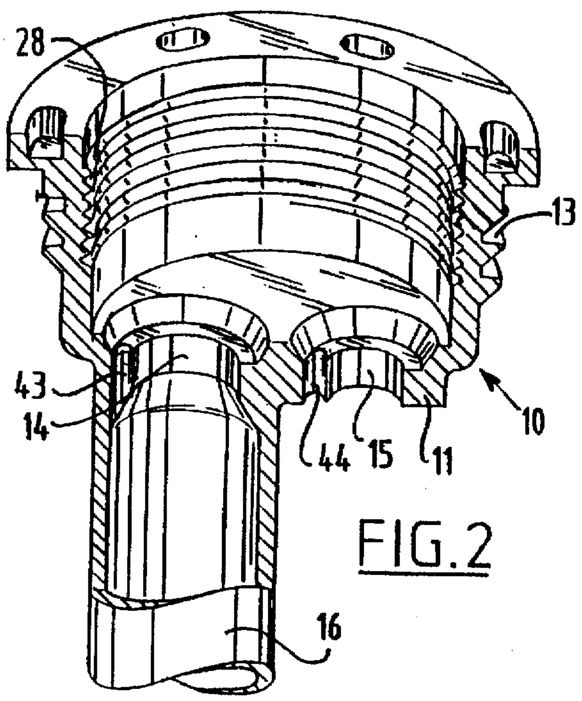
FIG. 2 is a view respectively section corresponding with FIG. 1 of the insert of FIG. 1.
Figure 3:
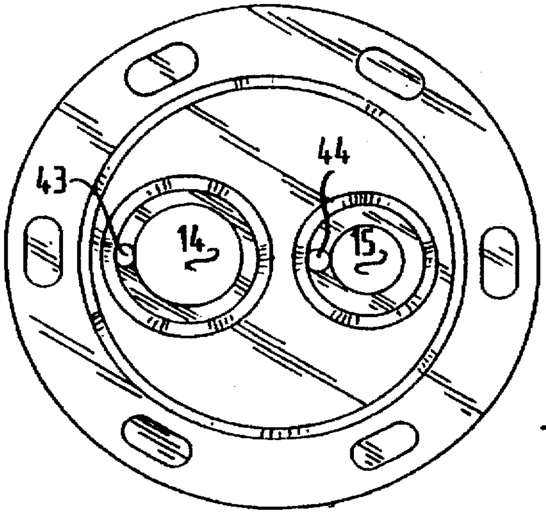
FIG. 3 is a top view of the insert of FIG. 2.

Designated with the numeral 1 is the container, only a part of which round the bung-hole 2 is shown. The container can be of random form and moreover be manufactured from random material, for instance metal or plastic.

The bung-hole 2 is preferably standardized and has to this end a cylindrical portion 3, on the inside of which is arranged an internal screw thread 4. The cylindrical portion continues upward as a thickened rim 5 having an annular groove 6 recessed into the outer wall thereof.

The device according to FIG. 1 for connecting a feed off and return tube to the bung-hole 2 of container 1 consists in the embodiment shown of an insert 10, which has a cylindrical form, and a bottom part 11. The outer wall of the cylindrical part 12 has a screw thread 13 which co-acts with the screw thread 4 of bung-hole 2. The bottom part 11 is provided with two orifices 14, 15 respectively, wherein at the orifice 14 the bottom 11 is extended downward with a dip tube 16. The length of dip tube 16 is sufficient to enable pumping or drawing of the liquid out of container 1.

The device further consists of a tube mounting 18 which can be placed on the bottom part 11 of insert 10 and which is provided with two ports 19, 20 respectively which are in communication with orifices 14, 15 of insert 10. The ports 19, 20 are extended upward with connecting stubs 21, 22 respectively for connecting a feed off respectively return tube (not shown). For the sake of completeness it is noted that connecting stub 21 is provided with a non-return valve mechanism 23, which is assumed known and is not elucidated further. The manner of connecting the feed off tube respectively return tube takes place by means of a screw connection, although the invention is of course not limited thereto.

Finally, the device consists of a clamp means 25 which is likewise provided with a cylindrical part 26, the outer screw thread 27 of which co-operates with the screw thread 28 of the insert 10 arranged on the inner cylinder wall. The clamp means 25 is provided on the top surface with lugs 30 which serve to screw clamp means 25 fixedly in the insert 10.

It is further noted that the tube mounting 18 is embodied close to the underside with a peripheral flange 31 against which presses the bottom edge of the cylindrical part 26 of the clamp means 25. By tightening clamp means 25 the mounting can thus be clamped firmly to the bottom of insert 10, wherein according to known art the separation between insert 10 and tube mounting 18, respectively insert 10 and bung-hole 2 of container 1 can be sealed by suitable sealing means, for instance rubber rings and the like.

Figure 4:
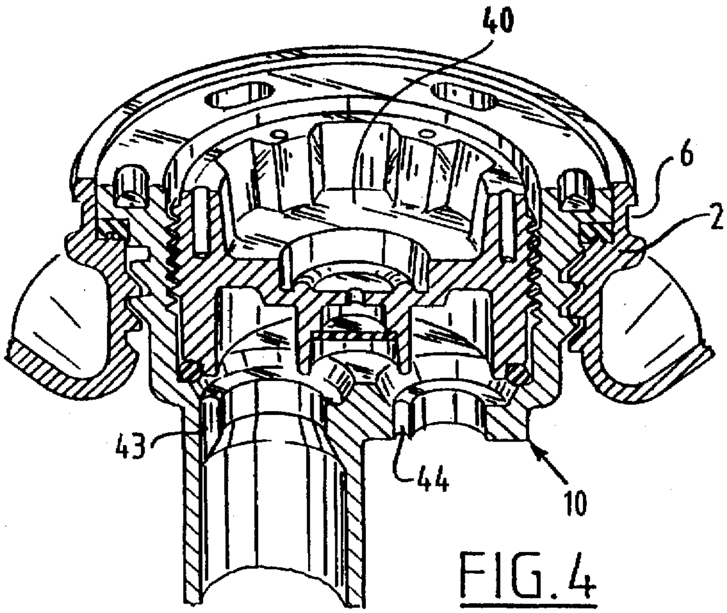
FIG. 4 is a view respectively section corresponding with FIG. 1 of the device provided with an insert and a closure arranged in the insert.

The above described device operates as follows:

The container 1 is filled by the supplier of the product stored in the container and then provided with the insert 10 with dip tube 16. Finally the insert 10 is provided with a closure 40, see FIG. 4, which closure, like the clamp means 25, is provided with an external screw thread which co-operates with the internal screw thread 28 of the insert.

It is remarked that both the insert 10 and the closure 40 lie fully countersunk in the bung-hole 2, so that the bung-hole 2 can be sealed in known manner by having a seal extend over the upper rim and clamp fixedly in the peripheral groove 6 of bung-hole 2.

At the premises of the user the closure 40 is loosened after optional removal of the seal and replaced by the tube mounting 18 which is fixed by the clamp means 25. No rotation of the tube mounting 18 herein takes place, and thus no twisting of the already connected feed off and return tube (not shown). This could cause problems.

The liquid from the container can be drawn off or pumped out via dip tube 16 to the connecting stub 21 and subsequently to the off feed tube. Possible excess liquid can be carried back via the return tube which is connected to stub 22, whereby the liquid can flow back into the container via the port 20 and orifice 15.

Since special liquids are involved here which have to be used for a particular process run, it is recommended to apply a safety measure such that a container with a determined liquid is connected to the correct feed off respectively return tube. Since it is usual to connect the tube mounting permanently to the feed off and return tube a mechanical coding between tube mounting 18 and insert 10 is therefore applied.

According to the invention this coding consists of respective lugs 41, 42 which protrude beneath the bottom of mounting 18 and are received in a recess 43 and 44 of insert 10 situated in the wall of the respective orifice 14 and 15 thereof. The recess debouches into the bottom surface of the cylindrical insert 10 so that the lugs 41 and 42 are received by a sliding movement into these recesses 43, 44.

The coding consists of the position of the recesses 43, 44 respectively the lugs 41, 42 being placed at a predetermined location along the periphery of the orifice 14, 15 respectively the port 19, 20.

Figure 5:
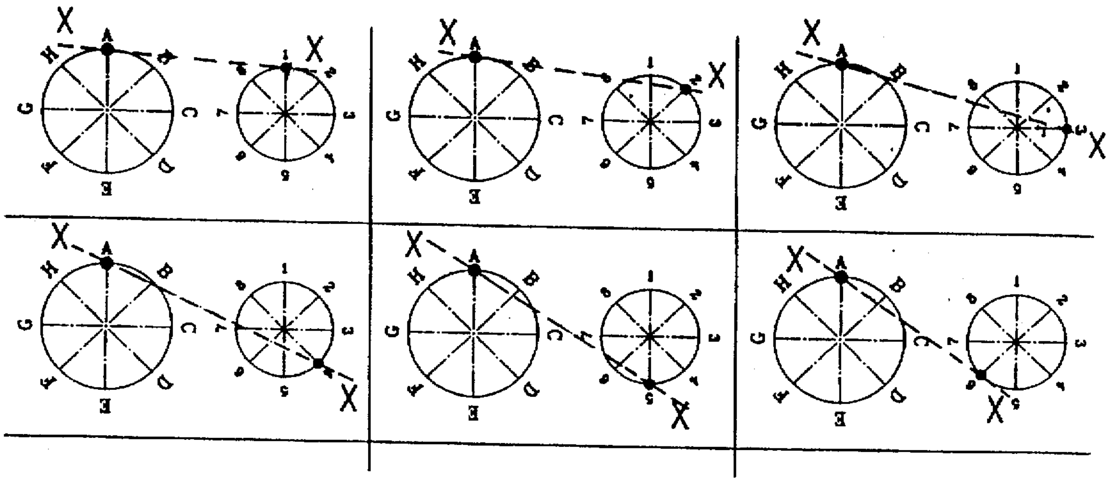
FIG. 5 is a schematic view of a coding arrangement.

This is shown in FIG. 5, wherein six examples are given, wherein the orifice 14 is designated schematically with the left-hand circle and the orifice 15 with the right-hand circle. The location at opening 14 designated with the letter and the location at opening 15 designated with the number indicate the recess and it will be apparent from the examples of FIG. 5 that with a displacement in each case through 45° sixty-four different combinations can be obtained.

It will of course be possible to achieve more options with a displacement smaller than 45°.

It is thus impossible for the user to connect a tube mounting 18 with predetermined lug position to an incorrect insert, that is, the wrong container.

Since the lugs 41, 42 protrude beyond the bottom of mounting 18 the latter will not be pushed sufficiently into the insert 10 when the connection is not good, which the user notices, because the mounting 18 can tilt sideways on a tilt axis which is defined by the line X—X indicated with dashed lines in FIG. 5.

The invention is not limited to the above described embodiment. It is thus possible to embody the insert 10 and the tube mounting 18 with more than two orifices respectively ports.

What is claimed is:

1. A device for connecting at least a feed off and return tube to a threaded bung-hole of a container having the threads at its inner periphery, said device comprising:

a cylindrical insert having threads at its outer periphery co-operating with the thread of the bung-hole, and a bottom part provided with at least two orifices;

a tube mounting having a lower surface to be placed on said bottom part of said insert and provided with ports being in communication with said orifices of the insert; and a clamp means to clamp said tube mounting to said insert, wherein said tube mounting and said insert are provided with lugs and co-operating recesses located according to a predetermined pattern wherein each said recess is provided in a wall portion of one of said orifices and debouching into said bottom part of said insert and said co-operating lugs extends axially out of said tube mounting.

2. The device according to claim 1, wherein said insert is provided with a thread at its inner periphery.

3. The device according to claim 2, wherein said clamp means is provided with a thread at its outer periphery co-operating with said inner thread of said insert, and said tube mounting is provided with an annular outer flange.

4. The device according to claim 1, wherein said insert is provided with a dip tube.

5. The device according to claim 1, wherein said tube mounting is provided with at least one port with a connecting stub for a tube to be connected therewith.

6. The device according to claim 1, further including a closure adapted to be arranged in said insert, the height of which is one of the same and smaller than the depth of a cylindrical portion of said insert.

7. The device according to claim 1 wherein each orifice includes one said recess.

8. The device according to claim 1, wherein said insert is provided with a thread at its inner periphery and said clamp means is provided with a thread at its outer periphery cooperating with said inner thread of said insert.

9. The device according to claim 8, further including sealing rings positioned between said insert and the bung-hole and between said insert and said tube mounting.

10. A device for connecting at least a feed off and return tube to a threaded bung-hole of a container having the threads at its inner periphery, said device comprising:

a cylindrical insert having threads at its outer periphery co-operating with the thread of the bung-hole, and a bottom part provided with at least two orifices;

a tube mounting having a lower surface to be placed on said bottom part of said insert and provided with ports being in communication with said orifices of the insert; and a clamp means to clamp said tube mounting to said insert, wherein said tube mounting and said insert are provided with recesses and co-operating lugs located according to a predetermined pattern wherein each said recess is provided in a wall portion of one of said ports and debouching into said lower surface of said tube mounting and said cooperating lug extends axially out of said insert.

* * * * *

UNITED STATES PATENT AND TRADEMARK OFFICE

CERTIFICATE OF CORRECTION

PATENT NO. : 5,667,253

DATED : September 16, 1997

INVENTOR(S) : Cornelis J. Jansen et al.

It is certified that error appears in the above-identified patent and that said Letters Patent is hereby corrected as shown below:

Title Page, under [56] References Cited, FOREIGN PATENT DOCUMENTS, insert:

| | | |
|---|---|---|
| --3608300 | 3/1986 | Germany |
| 9113538 | 10/1991 | Germany |
| 523915 | 7/1992 | European Pat. Off. |
| WO9318920 | 9/1993 | WIPO |
| WO9003329 | 4/1990 | WIPO--. |

Title Page, under [56] References Cited, U.S. PATENT DOCUMENTS, "4,467,987 8/1984 Knebel" should read --4,667,987 5/1987 Knebel--.

Claim 1 Column 4 Line 15 "lugs extends" should read --lug extends--.

Claim 7 Column 4 Line 33 after "claim 1" insert comma --,--.

Signed and Sealed this

Seventeenth Day of February, 1998

Attest:

BRUCE LEHMAN

*Attesting Officer*

*Commissioner of Patents and Trademarks*